United States Patent [19]

Brown et al.

[11] Patent Number: 4,736,990

[45] Date of Patent: Apr. 12, 1988

[54] PRESSURE LIMITED DIFFERENTIAL PRESSURE SWITCH

[75] Inventors: G. Emerson Brown, Niles, Mich.; Richard T. Hendrickson, South Bend, Ind.

[73] Assignee: Allied Corporation, Morristown, N.J.

[21] Appl. No.: 926,150

[22] Filed: Nov. 3, 1986

[51] Int. Cl.$^4$ ............ B60T 15/46; B60T 11/10; H01H 35/38

[52] U.S. Cl. ............ 303/84 A; 303/DIG. 3; 303/6 G; 200/82 D; 340/52 C; 188/151 A

[58] Field of Search ........ 183/151 A; 200/82 C, 200/82 D; 303/6 C, 84 A, 84 R, 115, DIG. 3, DIG. 4; 340/52 C

[56] References Cited

U.S. PATENT DOCUMENTS

| | | |
|---|---|---|
| 3,492,051 | 1/1970 | Kersting ............ 303/6 C |
| 3,700,286 | 10/1972 | Bueler ............ 200/82 D |
| 3,967,082 | 6/1976 | Remy ............ 303/6 C |
| 4,311,345 | 1/1982 | Schopper ............ 303/84 A |

Primary Examiner—Andres Kashnikow
Assistant Examiner—Timothy Newholm
Attorney, Agent, or Firm—Ken C. Decker

[57] ABSTRACT

A differential pressure switch includes a housing which carries a switch assembly which is actuated by movement of a differential pressure responsive piston slidable within the housing. The piston shifts in response to pressure differentials between the pressure levels in the chambers defined between the ends of the piston and the corresponding ends of the housing. The piston includes a pressure responsive stop that responds to pressure levels above a predetermined pressure level to engage the housing to thereby prevent shifting of the piston and actuation of the switch assembly regardless of the pressure differential across the piston, thereby limiting operation of the pressure switch to pressure levels below the predetermined maximum pressure level.

21 Claims, 2 Drawing Sheets

PRESSURE LIMITED DIFFERENTIAL PRESSURE SWITCH

BACKGROUND OF THE INVENTION

The present invention relates to a switch responsive to a predetermined differential pressure and more particularly to such a switch which incorporates a collapsible sliding valve member to prevent operation of the switch in response to an excess pressure level in one of the pressures being sensed.

A differential pressure switch, that is, a switch which operates in response to a predetermined pressure differential between two inputs thereto, is well known. Such switches are further commonly used in hydraulic devices such as automobile braking systems. One specific application of such a differential pressure switch is in an anti-lock braking system wherein the switch is connected between the primary and secondary hydraulic circuits or between one of the hydraulic circuits and a booster circuit. Such an application of a differential pressure switch is disclosed, for example, in my copending U.S. patent application Ser. No. 875,037, filed June 13, 1986, and commonly assigned with the present invention. It has been found, however, that even under normal operating conditions of such a braking system, it is possible for an ordinary differential pressure switch to be actuated thereby indicating a fault in the system when in fact the system is in a normal operating condition. This can, for example, happen during very hard brake applications when pressure in the brake circuits can build very rapidly from the direct application of foot pressure to the master cylinder pistons. This building of braking pressure occurs more rapidly and to a higher pressure than the pressure build in the hydraulic booster. Accordingly, master cylinder pressure can exceed boost pressure causing the differential pressure switch to actuate thereby indicating a fault when the sytem is normal. There therefore exists a need for a differential pressure switch to be used in an anti-lock braking system or other hydraulically boosted braking system which will provide a reliable indication of a fault indicative pressure differential while simultaneously obviating switch actuation caused by excess pressures.

Broadly, the invention is a differential pressure switch which comprises a valve body which incorporates a differential pressure piston therein the opposite ends of which are connected to first and second sources of pressurized fluid. The differential piston is normally biased to a central, neutral position and is bidirectionally movable in response to a predetermined differential pressure. A switch is operatively engaged by the differential piston to actuate in resdponse to movement thereof. The differential piston includes two piston elements telescopically engaged one within the other and maintained in an extended relationship by means of such as a preload spring. The piston elements are collapsible one within the other when the pressure of one of the pressure sources exceeds the other while the said other pressure is above a predetermined minimum pressure.

Typically, one pressure source is a master cylinder and the other pressure source is a hydraulic booster. Preferably, stop means are provided to limit the relative extension of the two piston elements, and second stop means are provided to prevent movement of the differential piston assembly when the assembly is collapsed.

It is therefore an object of the invention to provide a differential pressure switch which confirms that boost pressure is substantially equal to master cylinder pressure at low to normal operating pressures.

It is another object of the invention to provide such a switch that confirms that boost pressure is adequate.

Yet another object of the invention is to provide such a switch which detects that boost pressure is greater than the brake master cylinder pressure.

Another object of the invention is to provide a differential pressure switch which will not actuate when the boost pressure is above a predetermined minimum.

Still another object of the invention is to provide a differential pressure switch which includes a differential piston including a pair of telescopically engaged piston elements which will collapse one within the other and engage a stop means when pressure applied to the opposite ends of the differential piston are at or above a predetermined minimums to thereby prevent actuation of the switch means thereof.

BRIEF DESCRIPTION OF THE DRAWINGS

These and other objects and purposes of the invention and operation of the invention itself will be best understood when taken in conjunction with the following detailed specification and the appended drawings wherein.

DESCRIPTION OF THE PREFERRED EMBODIMENTS

Figure 1:
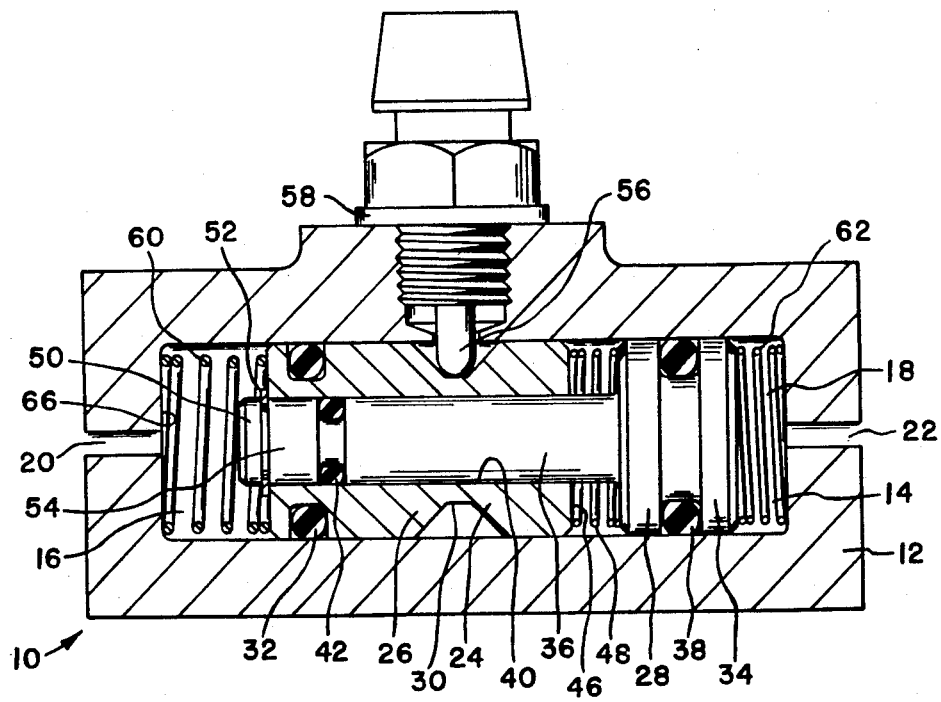
FIG. 1 is an axial sectional view of an embodiment of a differential pressure switch in accordance with the present invention.

Referring now to the drawings, there is shown in FIG. 1 a first embodiment of a pressure differential switch indicated generally at 10 in accordance with the invention. The switch comprises a switch body 12 having a substantially closed cylindrical bore 14 therein. The opposite ends 16, 18 of the bore 14 are provided with first and second fluid ports 20, 22, respectively, to enable connection to first and second sources of pressurized fluid (not shown). Typically, port 20 will be connected to the output of the hydraulic booster of an anti-lock braking system and port 22 will be connected to one of the master cylinder outlet ports of the braking system. The first and second sources of pressurized fluid may, of course, be any two sources of pressurized fluid the differential pressure of which is desired to be measured or sensed. A differential pressure piston assembly 24 is slideably received in the bore 14.

Assembly 24 includes first and second piston elements 26, 28. Element 26 is a generally hollow, cylindrical element having a diameter complementary to the bore 14 and provided with a circumferential recess 30. An "O" ring 32 provides a fluid tight seal between piston element 26 and the bore 14.

Second piston element 28 includes an enlarged cylindrical end portion 34 and a reduced diameter, cylindrical shaft portion 36. Enlarged end portion 34 has a diameter complimentary to the bore 14 and is slideably, fluid tightly engaged therewith by means such as an "O" ring 38. Shaft portion 36 is slideably received in a complimentary cylindrical bore 40 extending through the piston element 26. A fluid tight seal is formed between shaft portion 36 and bore 40 by an "O" ring seal 42.

Shaft portion 36 is dimensioned such that it extends axially outwardly from the bore 40 and the enlarged head portion 34 is disposed in axially spaced relationship to the adjacent end 46 of piston element 26. A spring 48 is compressed between the end 46 and head portion 34. The opposite end 50 of shaft portion 36 is fitted with a lock ring 52 which prevents separation of the piston elements 26 and 28. The end 50 extends axially outwardly from the end 54 of shaft portion 36.

Recess 30 is tapered at its opposite ends and the actuator pin 56 of a switch 58 extends downwardly (as viewed in the drawings) into the recess 30. A pair of compression springs 60, 62 are received in the chambers 16, 18 and maintain the valve assembly in a center or neutral position as shown in the drawings.

In operation, in response to normal pressures in the chambers 16, 18, the valve assembly 24 remains in a substantially centered position as is shown in the drawings. In the event of a pressure failure in either chamber 16 or 18, the entire valve assembly 24 will slide as a unit in the direction of the chamber having the low pressure. This movement will cause the recess 30 to move to the right or left to actuate the switch pin 56 and switch 58.

The spring 48 is relatively stiff and is compressed or preloaded to a predetermined pressure, typically a force equivalent to 1,000 pounds per square inch in a working embodiment of the invention. Accordingly if the pressure in chamber 16 and chamber 18 are at 1,000 psi or greater, pressure on the valve elements 26 and 36 will cause compression of the spring 48. This compression of the valve elements does not produce actuation of the switch 58. Simultaneously, the end 50 of shaft portion 36 will come into abutting engagement with end wall 66 of the chamber 16. This prevents further leftward (as viewed in the drawings) movement of the valve element 36. Movement of the valve element 26 will not occur so long as the pressure in chamber 16 remains at 1,000 psi or greater. Accordingly, under these conditions, that is, a pressure of 1,000 psi or greater in chamber 16, the switch will not respond to differential pressure between the chambers 16 and 18. Accordingly, if the chamber 18 is connected to a master cylinder output and chamber 16 to a hydraulic booster output, it will be seen that the switch will not respond to a differential pressure between the master cylinder and boost pressures where master cylinder pressure is greater than boost so long as the boost pressure remains at a predetermined minimum pressure. The switch will, however, respond to a differential pressure between the two chambers that results from either a failure of the master cylinder pressure or a failure of the boost pressure below its predetermined minimum value.

Figure 2:
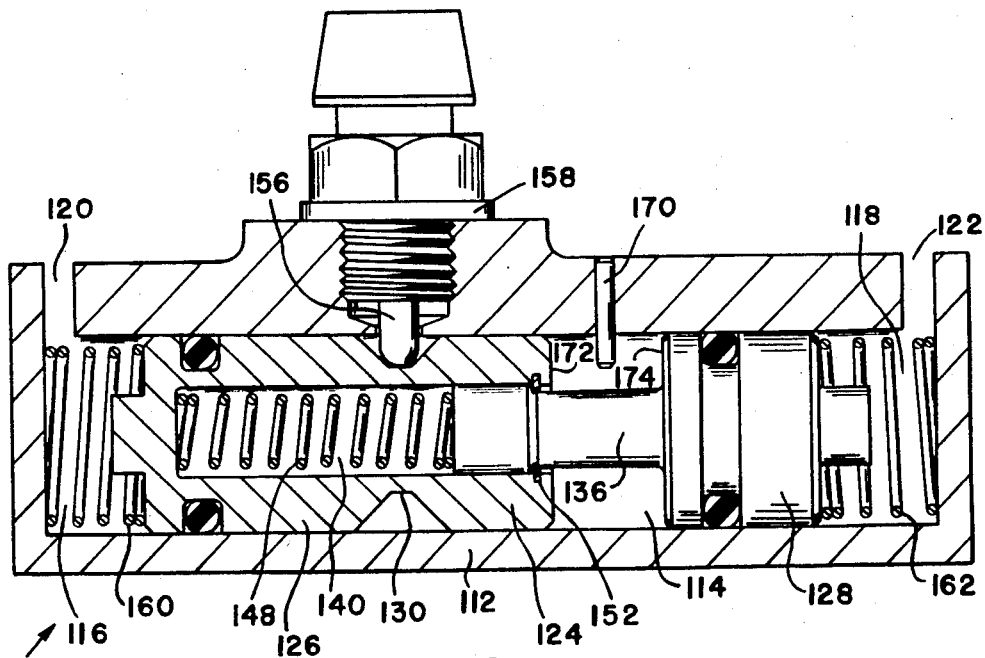
FIG. 2 is an axial sectional view of an alternative embodiment of the invention.

Referring now to FIG. 2, there is shown an alternative embodiment of the invention wherein like elements bear like numerals increased by 100. The valve 100 again includes a valve body 112 having a bore 114. A piston assembly 126 divides the bore 114 into two pressure chambers 116, 118. The chambers 116, 118 are provided with fluid ports 120, 122 which communicate with first and second sources of pressurized fluid (not shown). The valve assembly 126 is biased to a neutral or center position as shown in the drawings by means of springs 160, 162 and includes a pair of telescopically engaged valve elements 126 and 128. A recess 130 is formed in the valve element 126, recess 130 operatively engaging the pin 156 of a switch 158.

In this embodiment, the neck or shaft portion 136 of valve element 128 is telescopically received in a closed bore 140 formed in the valve element 126. The valve elements 126 and 136 are maintained in axially spaced relation by a compression spring 148. As with the previous embodiment, a differential pressure between chambers 116 and 118 will cause movement of the valve assembly 124 in the direction of the low pressure chamber. This movement produces actuation of switch pin 156 and switch 158 to indicate the differential pressure. However, if the pressure in chamber 116 is at or above a predetermined minimum pressure determined by the preload on the spring 148, the valve elements 126 and 136 will collapse one into the other without producing any corresponding actuation of the switch 158. Further axial movement of the valve element 136 is prevented by a stop pin 170 disposed between the ends 172 and 174 of the valve elements 126, 136. Under these conditions a differential pressure between the chambers 116 and 118 such as would occur if the pressure in chamber 118 should spike will not produce movement of the valve element 126 and accordingly will not actuate the switch 158. Again, it will be seen that this differential pressure switch will respond to normal differential pressures between chambers 116, 118 such as will result if there is a pressure failure in either of the first and second pressure sources. However, as long as the pressure in chamber 116 remains at or above a predetermined minimum, valve assembly 124 will collapse without actuation of the differential pressure switch and the switch will not respond to differential pressure caused by the pressure in chamber 118 exceeding pressure in chamber 116.

Figure 3:
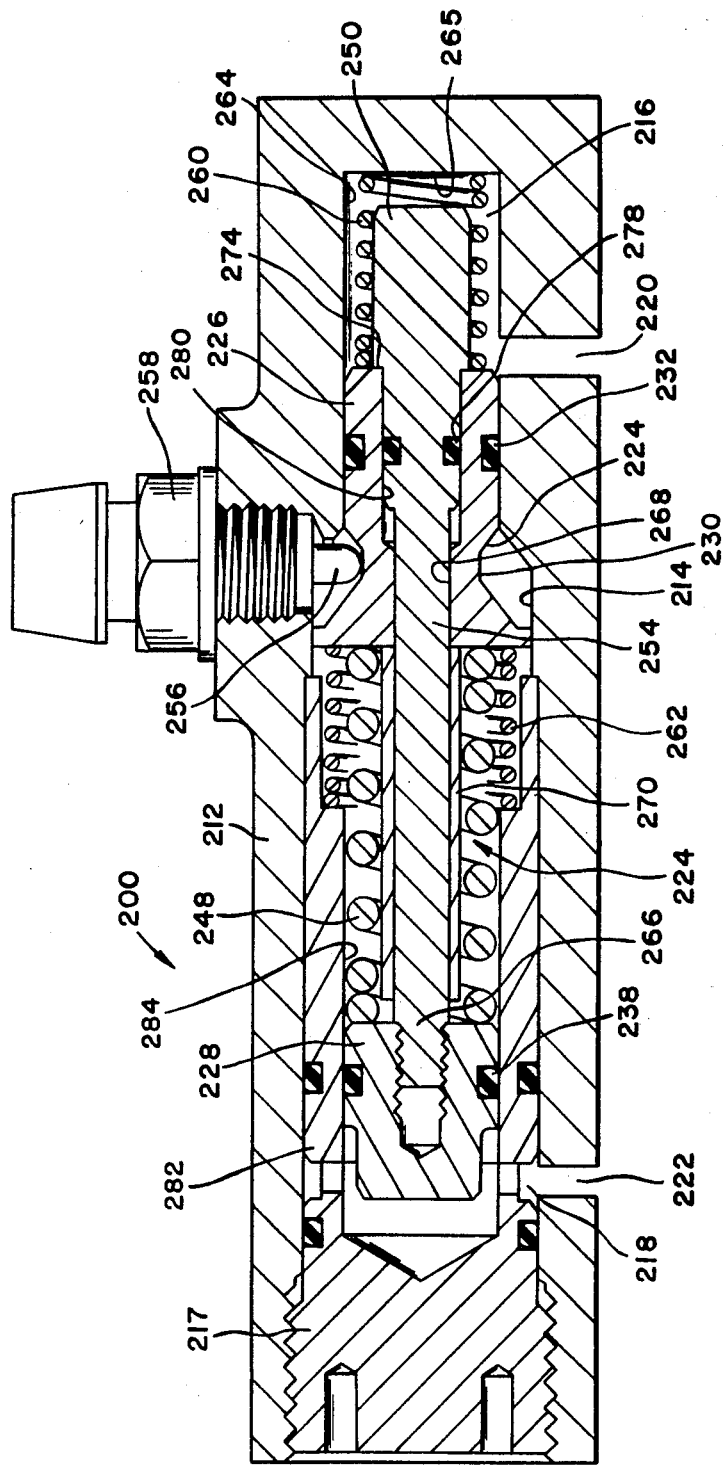
FIG. 3 is an axial sectional view of yet another embodiment of the invention.

Referring not to FIG. 3, there is shown yet another embodiment of a pressure limited differential pressure switch in accordance with the invention wherein like elements bar like numerals increased by 200. The switch 210 includes a body 212 having a substantially closed cylindrical bore 214 therein. The opposite ends 216, 218 of the bore 214 are provided with first and second fluid ports 220 and 222, respectively. Valve assembly 224 is slideably received in the stepped bore 214 and the bore is closed by a threaded end plug 217. Piston assembly 224 includes a first valve element 226 and a second valve element 228. Element 226 is slideably received in the small diameter portion 264 of the bore 214 and provided with an O ring seal 232 to define pressure chamber 216. Element 226 further is provided with recess 230 which engages actuating pin 256 of switch 258.

Valve element 228 is slideably received in bore 284 of sleeve 282 located in bore 214 and provided with an O ring seal 238 to define the chamber 218. The diameters of bores 264 and 284 are substantially the same. An elongated stem 254 is fixably secured to the element 228 by means of a threaded end 266. Stem 254 is slideably received through bores 268 and 280 in the first valve element 226. The distal end portion 250 of the stem 254 extends axially outwardly from the valve element 226 and terminates in spaced relationship to the end 265 of the bore 214.

A sleeve or spacer 270 is carried on the stem 254 between the first and second valve elements 226, 228, the spacer 270 having an axial dimension less than the axial spacing between facing end surfaces of the valve elements 226, 228.

A preload spring 248 abuttingly engages spacing surfaces of the valve elements 226, 228 and is maintained in a predetermined preload compression by means of the shoulder 274 on stem 254 which engages the valve element 226.

A pair of centering springs 260, 262 engage the first valve element 226 maintaining valve assembly in a substantially centered or neutral position. A fluid tight seal is maintained between the stem 254 and bore 280 of first valve element 226 by an O ring seal 278. As with the previous embodiments, at a designated pressure level determined by the preload spring 248, further by the differential area between bores 264 and 280, the stem 254 will move to the right (as viewed in the drawings) collapsing spring 248 and second valve element 228 will engage the adjacent end of the spacer 270. As this occurs, the first valve element remains substantially fixed by action of the springs 260, 262. With the second valve element in contact with the spacer 270, the distal end 250 of the stem 254 moves into close proximity with the end 265 of the bore 214. This effectively prevents travel of the valve assembly in one direction (to the right as viewed in the drawings) and a veiled pressure, typically boost pressure, will not be registered by the mechanism during a normal booster "run out" condition. If the pressure in chambers 216 and 218 is below the predetermined collapse level, the switch assembly functions normally, moving to the left for failed or below standard master cylinder pressure and to the right for failed or below standard boost pressure as established by the balance springs 260, 262.

In the event that a complete booster master cylinder pressure loss occurs when the spool mechanism is in its collapse position, a normal function will be restored and the appropriate failure will again be registered.

This differential pressure switch has particular adaptation in braking system of the anti-lock type wherein it is desirable to detect differential pressures between the master cylinder output and booster output but wherein it is desired that the switch not respond to short high pressure spikes occurring in the master cylinder output during hard brake applications or during long anti-lock braking operation so long as the pressure in the chamber 116 connected to the boost output remains at or above a predetermined minimum pressure, typically 1,000 pounds per square inch.

Furthermore, it is contemplated that one skilled in the art can make many modifications and/or changes to the invention as described herein without deviation from the essence thereof. As such these modifications and/or changes are intended to fall within the scope of the appended claims.

What we claim is:

1. A differential pressure switch comprising a valve assembly interposed between first and second pressure chambers connected to first and second sources of pressurized fluid, and being movable from a centered position to either of a pair of translated positions in response to a pressure differential between said chambers, switch means engaging said valve assembly for actuation in response to movement of said valve assembly from said centered position toward either of said pair of translated positions, said valve assembly including pressure responsive stop means actuatable from a first condition permitting movement of the valve assembly in response to a pressure differential between said chambers to a second condition immobilizing said valve assembly sufficiently to prevent actuation of said switch means regardless of the pressure differential between said chambers, said stop means including means responsive to the pressure level in one of said chambers to actuate said stop means from said first condition to said second condition when the pressure level in said one chamber exceeds a predetermined level.

2. The differential pressure switch of claim 1 wherein said valve assembly includes two valve elements connected one to the other for movement between first and second positions in response to fluid pressure in said first and second chambers above and below said predetermined minimum pressure, respectively.

3. The differential pressure switch of claim 2 wherein said first and said second valve elements are disposed and axially extended in axially collapsed positions with respect to each other when in said first and said second positions, respectively, at least one of said valve elements engaging said stop means when said valve elements are in said second position.

4. The differential pressure switch of claim 3 wherein said stop means includes a preload spring compressively received between said first and said second valve elements.

5. The differential pressure switch of claim 4 wherein said first and said second valve elements are telescopically engaged one with the other, said preload spring being disposed therebetween to exert a pressure thereon equal to said predetermined minimum pressure, said spring compressing in response to a pressure above said predetermined minimum pressure.

6. The differential pressure switch of claim 5 further including a valve body having a bore therein, said valve assembly being slideably received in said bore to define the first and second pressure chambers at the opposite ends thereof, and further including sealing means performing a fluid tight seal between each of said valve elements in said bore.

7. The differential pressure switch of claim 6 further including centering spring means for maintaining said valve assembly centered in said bore.

8. The differential pressure switch of claim 7 wherein said switch means includes a recess formed in the side wall of one of said valve elements at a two position switch fixedly secured to said valve body and including a stem extending into said bore and disposed in said recess when said valve assembly is in said centered position thereof.

9. The differential pressure switch of claim 8 wherein one of said valve elements includes an elongated stem portion extending axially through the other of said valve elements, said stem portion engaging an end wall of said bore when said first and second valve elements are in their collapsed positions, said switch means engaging the other of said valve elements.

10. The differential pressure switch of claim 8 wherein said stop means includes a pin extending radially into said bore, one of said valve elements abuttingly engaging said pin once said first and second valve elements are in said second positions thereof, said switch means engaging said recess when said valve assembly is in said centered position thereof.

11. A differential pressure switch comprising:

a valve body, an elongated bore in said body having first and second port means communicating with the opposite ends thereof for connecting said opposite ends to first and second sources of pressurized fluid, a valve received in said bore for sliding movement between said ends and defining therewith first and second pressure chambers, said valve including first and second valve elements operatively connected one to the other for movement between first and second relative positions, said valve being shiftable from a centered position to either of a pair of translated positions in response to a pressure differential between said chambers, switch means operatively engaged with one of said valve elements and being operable in response to movement of said valve toward either of said translated positions, first biasing means yieldably maintaining said valve centered in said bore, second biasing means resiliently holding said first and second valve elements in a first relative position, said elements being movable from said first to said second relative position in response to a predetermined pressure in each of said chambers, stop means responsive to movement of said valve elements to said second relative position for immobilizing said valve sufficiently to prevent operation of the switch means regardless of the pressure differential between said chambers when said valve elements are in said second relative position, said stop means permitting movement of said valve toward either of said translated positions only when the valve elements are in the first relative position, whereby said valve is movable in said bore in response to a difference in pressure in said first and second chambers and said switch means is operable only when the pressure in one of said chambers is below said predetermined pressure.

12. The differential pressure switch of claim 11 wherein said first and said second valve elements are telescopically engaged one within the other for relative movement axially in said bore, and further including valve element stop means for limiting the relative axial movement of said first and said second valve elements.

13. The differential pressure switch of claim 12 wherein said first and said second valve elements include facing axially displaced surfaces, said second biasing means including a spring compressed between said surfaces to exert a predetermined force thereagainst.

14. The differential pressure switch of claim 13 wherein said first biasing means includes a pair of springs compressed between the opposite ends of said valve and respective opposite ends of said bore.

15. The differential pressure switch of claim 14 wherein said first valve element includes an axial bore therethrough, said second valve element including a stem portion slidably received in and extending through said first valve element bore to project axially outwardly therefrom, said stem portion abuttingly engaging an end of said bore when said facing surfaces are proximate one to the other in response to compression of said second biasing means.

16. The differential pressure switch of claim 14 wherein said stop means includes an element extending radially into said bore in a position disposed between said facing surfaces, one of said surfaces engaging said element when said first and said second valve elements are in said second relative position.

17. The differential pressure switch of claim 14 further including means for limiting the movement of said facing surfaces axially away from each other.

18. The differential pressure switch of claim 17 wherein said movement limiting means includes a locking element secured to one of said valve elements and axially abuttingly engaging a surface of the other of said elements when said first and said second valve elements are in said first relative position.

19. The differential pressure switch of claim 14 further including means for providing a fluid tight seal between said first and said second valve elements and said bore, said seals fluid tightly isolating said first and second pressure chambers.

20. The differential pressure switch of claim 19 wherein said first pressure source is the booster of a hydraulically boosted braking system, and the other pressure source is the output of the master cylinder of said system.

21. The differential pressure switch of claim 20 wherein said predetermined pressure is about 1,000 psi.

* * * * *